(12) United States Patent
Shin et al.

(10) Patent No.: US 7,403,257 B2
(45) Date of Patent: Jul. 22, 2008

(54) LIQUID CRYSTAL DISPLAY DEVICE AND INSPECTING METHOD OF BONDING STATE BETWEEN LIQUID CRYSTAL DISPLAY PANEL AND DRIVE IC

(75) Inventors: Chul-Sang Shin, Chungcheongnam-Do (KR); Deok-Nyoung Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 269 days.

(21) Appl. No.: 10/950,500

(22) Filed: Sep. 28, 2004

(65) Prior Publication Data
US 2005/0099565 A1 May 12, 2005

(30) Foreign Application Priority Data
Nov. 7, 2003 (KR) ............... 10-2003-0078772

(51) Int. Cl.
*G02F 1/1345* (2006.01)
(52) U.S. Cl. ............ 349/152; 349/149; 349/150; 349/151
(58) Field of Classification Search .......... 349/149–152
See application file for complete search history.

(56) References Cited
U.S. PATENT DOCUMENTS
6,219,124 B1 * 4/2001 Lee et al. .............. 349/147
6,266,120 B1 * 7/2001 Han .................... 349/150
2002/0008832 A1 * 1/2002 Hasegawa et al. ....... 349/151
2003/0067580 A1 * 4/2003 Song et al. ............. 349/187

FOREIGN PATENT DOCUMENTS
KR 100163937 B1 9/1998
KR 1999-0025717 U 7/1999

* cited by examiner

*Primary Examiner*—David C. Nelms
*Assistant Examiner*—Phu Vu
(74) *Attorney, Agent, or Firm*—Birch, Stewart, Kolasch & Birch, LLP

(57) ABSTRACT

An LCD device includes a pixel part, formed on a substrate, where a plurality of gate lines and data lines are arranged perpendicular to each other and a plurality of pixels are formed. A terminal has active pads formed on a substrate which communicate a signal to respective ones of the gate lines and data lines of the pixel part. The terminal also has dummy pads formed adjacent to the active pads a transparent material is adjacent or over the dummy pads so as to check a pressed state of conductive balls. A drive IC having a terminal with pads electrically connected one-to-one to the pads of active pads formed on the substrate through the conductive balls, so s to supply a gate signal and/or a data signal to the respective gate line and/or data line.

18 Claims, 4 Drawing Sheets

US 7,403,257 B2

LIQUID CRYSTAL DISPLAY DEVICE AND INSPECTING METHOD OF BONDING STATE BETWEEN LIQUID CRYSTAL DISPLAY PANEL AND DRIVE IC

The present application claims, under 35 U.S.C. § 119, the benefit of Korean Patent Application No. 2003-78772 filed Nov. 7, 2003, the entire contents of which are herein fully incorporated by reference.

BACKGROUND OF THE INVENTION

1. Field of the Invention

The present invention relates to a liquid crystal display (LCD) device. More particularly, the present invention related to a method of inspecting a bonding state between a liquid crystal display panel and a drive IC and a structure enabling easy checking of a pressed state of conduct balls of anisotropic conductive film electrically connecting a pad part and a drive IC of a liquid crystal panel.

2. Description of the Background Art

Liquid crystal displays (LCDs) are becoming lighter and thinner, they can operate with relatively low power consumption, and their picture quality continues to improve with enhancements of liquid crystal materials and development of fine pixel processing techniques. As such, LCDs have a wide variety of applications and their use continues to expand.

An LCD can be divided into a liquid crystal panel and a drive IC. The liquid crystal panel includes liquid crystal cells arranged in a matrix form between two sheets of glass substrates (namely, an upper glass and a lower glass), and switching devices (namely, a TFT array) for switching signals supplied to the liquid crystal cells. The drive IC is mounted on a printed circuit board (PCB) and drives the liquid crystal panel.

A TCP (Tape Carrier Package) is used to transfer a signal between the liquid crystal panel and the PCB. The TCP is directly attached to the lower glass and the printed circuit board by using a conductive resin such as an anisotropic conductive film (ACF) or the like. In this case, the ACF includes conductive balls having conductivity.

When the TCP is pressed with a certain pressure so as to be attached to an attachment portion (namely, a contact portion between the TCP and the lower glass or between the TCP and the PCB), the conductive balls in the ACF provides conductivity between the two attached surfaces. In this respect, however, when the conductive balls are pressed, if they fail to be pressed adequately to a state suitable for signal transmission, a distortion occurs in signal transmissions.

In a related art, in order to monitor the pressed state of the conductive balls, a measurement unit is used, or the pressed state is visually checked by the naked eye by using pressurization paper. Thus, the expense is increased according to employing the measurement unit, and/or the fabrication process is delayed due to the additional process of checking the state of the conductive balls by using the pressurization paper.

SUMMARY OF THE INVENTION

Therefore, an object of the present invention is to provide a liquid crystal display (LCD) device and a method for easily inspecting a pressed state of conductive balls in an ACF when connecting a pad part (gate pad and data pad) of an LCD device and a TCP by using the ACF.

To achieve these and other advantages in accordance with the present invention, as embodied and broadly described herein, there is provided an LCD device including: a substrate; a pixel part formed on the substrate; a plurality of pixels formed on the pixel part and connected to a plurality of gate lines and plurality of data lines; a plurality of active gate pads, forming a gate connection terminal on the substrate, the plurality of active gate pads being connected to respective ones of the plurality of gate lines; a plurality of active data pads, forming a data connection terminal on the substrate, the plurality of data pads being connected to respective ones of the plurality of data lines; a first dummy pad formed on a first side of at least one of the gate connection terminal and the data connection terminal; and a second dummy pad formed on a second side of the at least one of the gate connection terminal and the data connection terminal, wherein a first portion of the substrate, proximate the at least one first dummy pad, is formed of a transparent material, and wherein a second portion of the substrate, proximate the at least one second dummy pad, is formed of a transparent material.

According to another aspect of the present invention, there is also provided an LCD device including: a substrate; a pixel part formed on the substrate a plurality of pixels formed on the pixel part and connected to a plurality of gate lines and plurality of data lines; a plurality of active gate pads, forming a gate connection terminal on the substrate, the plurality of active gate pads being connected to respective ones of the plurality of gate lines; a plurality of active data pads, forming a data connection terminal on the substrate, the plurality of data pads being connected to respective ones of the plurality of data lines; a first dummy pad formed on a first side of at least one of the gate connection terminal and the data connection terminal; a second dummy pad formed on a second side of the at least one of the gate connection terminal and the data connection terminal; a drive IC having a plurality of signal pads for connection with the plurality of active pads of the at least one of the gate connection terminal and the data connection terminal, wherein a first portion of the drive IC, proximate a first side of the signal pads, is formed is of a transparent material, and wherein a second portion of the drive IC, proximate a second side of the signal pads, is formed is of a transparent material.

According to another aspect of the present invention, there is also provided an method of checking a bonding during the assembly of an LCD device including: a substrate; a pixel part formed on the substrate; a plurality of pixels formed on the pixel part and connected to a plurality of gate lines and plurality of data lines; a plurality of active gate pads, forming a gate connection terminal on the substrate, the plurality of active gate pads being connected to respective ones of the plurality of gate lines; a plurality of active data pads, forming a data connection terminal on the substrate, the plurality of data pads being connected to respective ones of the plurality of data lines; a first dummy pad formed on a first side of at least one of the gate connection terminal and the data connection terminal; a second dummy pad formed on a second side of the at least one of the gate connection terminal and the data connection terminal; a drive IC having a plurality of signal pads for connection with the plurality of active pads of the at least one of the gate connection terminal and the data connection terminal, the method comprising the steps of: positioning an anisotropic conductive film between the plurality of active pads of the at least one of the gate connection terminal and the data connection terminal and the plurality of signal pads of the drive IC; aligning the plurality of signal pads of the drive IC with the plurality of active pads of the at least one of the gate connection terminal and the data connection terminal; bonding the plurality of signal pads of the drive IC with the plurality of active pads of the at least one of the gate connection terminal and the data connection terminal; and inspecting the anisotropic conductive film via at least one transparent portion formed in at least one of the drive IC and the substrate.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
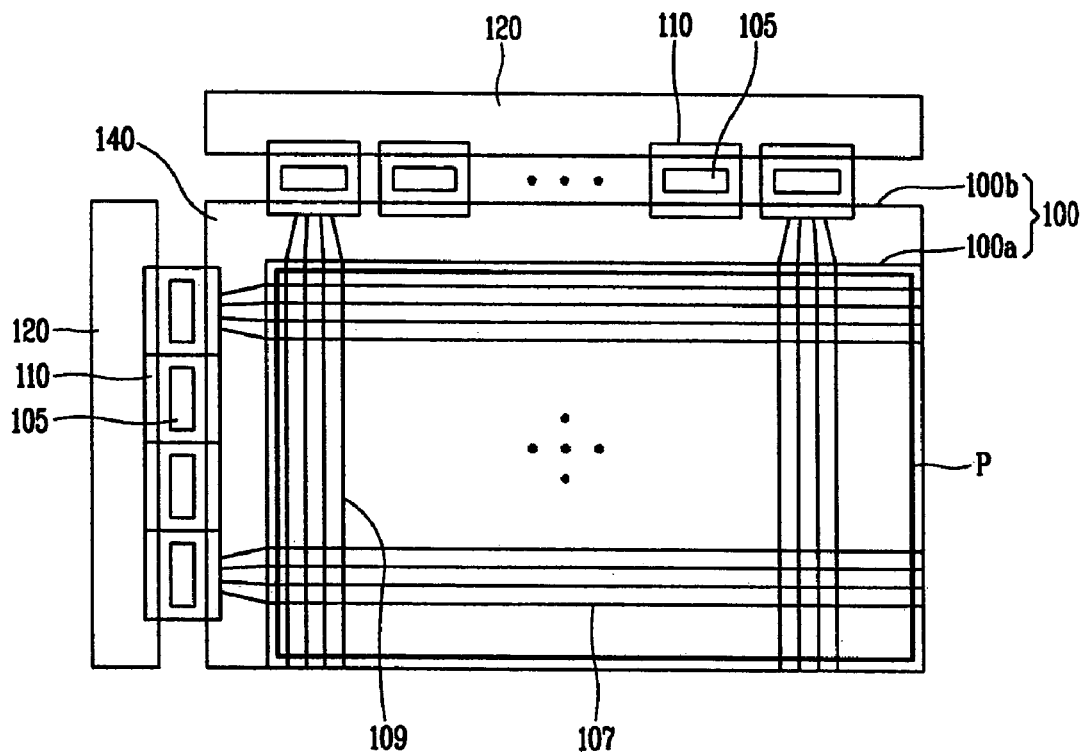
FIG. 1 shows an LCD device, in accordance with the present invention.
Figure 2:
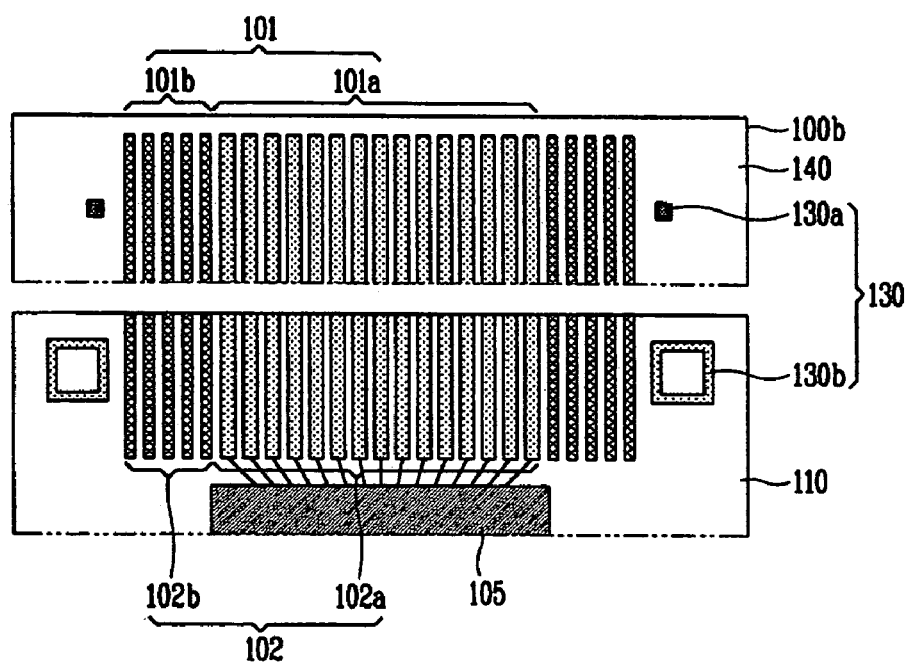
FIG. 2 shows one embodiment of a pad part, in accordance with the present invention.

FIG. 1 shows a schematic plane structure of an LCD in accordance with the present invention, and FIG. 2 shows a schematic structure of a pad part formed on a thin film transistor substrate of FIG. 1.

As shown, the LCD device includes a liquid crystal panel 100 including a color filter substrate 110a and a thin film transistor substrate 100b. The LCD device also includes IC 105 for driving the liquid crystal panel 100.

A liquid crystal layer is formed between the two substrates 100a and 100b. A color filter and a black matrix (not shown) are formed on the color filter substrate 100a.

A plurality of gate lines 107 and a plurality of data lines 109 are arranged perpendicular to each other, vertically and horizontally, to form a pixel part (P) defining a plurality of pixel. A thin film transistor is formed at each pixel.

A pad part 140 includes a plurality of pads which are connected to one side of respective gate/data lines 107 and 109. The pad part is formed at an edge of the thin film transistor substrate 100b, not covered by the color filter substrate 100a. Matching pads are connected to a TCP 110. The TCP 110 has the drive IC 105 mounted thereon in order to drive the liquid crystal panel 100. The TCP 110 is also connected to a PCB (Printed Circuit Board) 120. The PCB 120 includes various elements and integrated circuits and generates various control signals and data signals to drive the liquid crystal panel 100.

With reference to FIG. 2, a terminal 101 includes an active pad 101a (or connection terminal) and a dummy pad 101b. Individual pads of the active pad 101a are connected to respective gate lines and/or data lines. The active pad 101a and dummy pad 101b are formed on the pad part 140 of the thin film transistor substrate 100b.

On the TCP 110, an active pad 102a (or connection terminal) and dummy pad 102b are connected to each terminal of the driving IC 105. The active pad 102a and dummy pad 102b are formed to correspond one-to-one to pads 101a, 101b of the terminal 100 on the pad part 140. Monitoring windows 130 are formed at right and left sides of the dummy pads 101b and 102b.

The TCP 110 is connected to the pad part 140 of the TFT substrate 100b. The TCP 110 can be connected to the pad part 140 of the substrate 100b by an adhesive anisotropic conductive film (ACF) including conductive particles on the pad part 140, adjusting the terminal 102 of the TCP 110 to the terminal 101 of the pad part 140 to assure proper alignment and then applying an appropriate heat and pressure.

Figure 3:
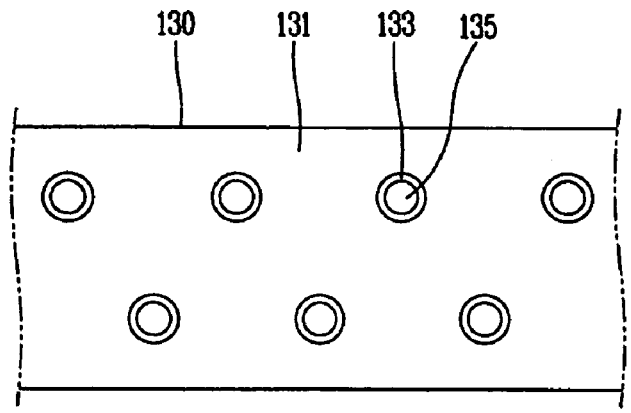
FIG. 3 shows an anisotropic conductive film.

As shown in FIG. 3, the ACF includes several conductive balls 135 covered by an insulating coating film 133 inside the anisotropic film 131.

After the ACF is attached to the pad part 140, the pads of the terminal 102 of the TCP 110 are arranged to correspond to the pads of the terminal 101 of the substrate 100b, and then heat and pressure are applied. As the conductive balls 135 are pressed, the insulating coating films 133 covering the conductive balls 135 are broken which allows the conductive balls 135 to electrically connect the pad terminals on a one-to-one basis.

In order to make the pads of the terminal 101 of the substrate 100b and the pads of the terminal 102 of the TCP 110 correspond or align with each other, the monitoring windows 130 are positioned at both sides of the terminals 102, 101, more especially at both sides of the dummy pads 101b and 102b and function as an alignment key.

In bonding the pads of the terminal 102 of the TCP 110 to the liquid crystal panel, if the insulating coating film 133 is not broken due to insufficient pressing of the conductive balls 135, contact resistance between the pads of the terminal 101 and 102 is increased so that signal transmission is deteriorated.

Thus, in the present invention, the windows 130b formed on the TCP 110 are formed of a transparent material such as indium tin oxide (ITO) or indium zinc oxide (IZO) in order to monitor the pressed state of the conductive balls 135 in bonding. By this arrangement, the bonding state between the liquid crystal panel 100 and the TCP 110 can be checked efficiently.

Figure 4:
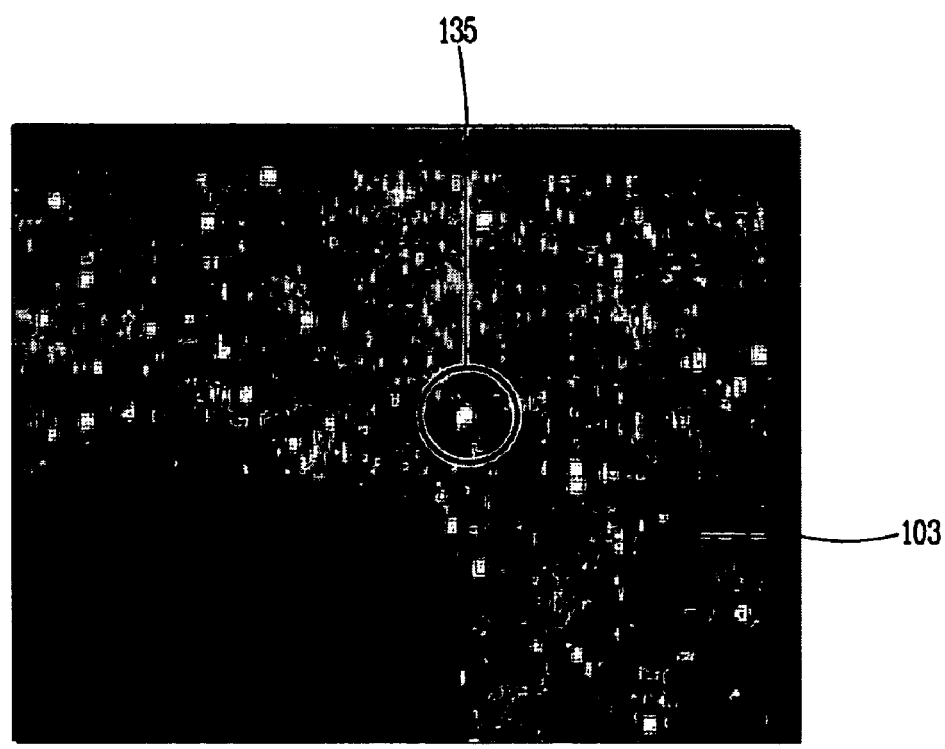
FIG. 4 shows a pressed state of conductive balls of the anisotropic conductive film observed through a monitoring window.

FIG. 4 shows a pressed state of conductive balls 135 observed through a monitoring window 130b. As shown, the pressed state of the conductive balls 135 can be observed through the monitoring window 130b formed of a transparent material. The monitoring windows 130a are formed of a translucent material to assist in viewing the conductive balls 135. The pressed state of the conductive balls 135 is monitored by counting the number of pressed conductive balls 135 as observed through the monitoring window 130b. Namely, if the number of conductive balls 135 observed through the monitoring window 130b positioned at both sides of the dummy pad 102b is different, it is determined that a pressure has not been applied uniformly. For example, if more conductive balls 135 are counted through the right window 130b than the left window 130b, it can be seen that more pressure and/or heat was applied to the right side.

In addition, even though uniform pressure is applied to the pad part 140, the applied pressure can be less than a pre-set required pressure. In this case, the number of pressed conductive balls 135 measured through the left and right monitoring windows 130b is compared with the pre-set number, and if the number of the pressed conductive balls 135 is less than the pre-set number, it is determined that an insufficient pressure or heat has been applied and thus the bonding has not been made properly.

As mentioned above, by forming the monitoring window 130b of a transparent material and by providing a monitoring window 130b at both sides of the terminal 102, the pressed state of the conductive balls 135 can be easily checked.

However, since the position of the monitoring windows 130b are not a region where the terminal 102 actually is formed, the checked pressed state of the conductive balls 135 and an actual pressed state of the conductive balls 135 in the terminal 102 can be different. This degrades the reliability of the inspection.

In order to solve such a problem, in an LCD device of another embodiment of the present invention, a monitoring window 180 for checking a pressed state of the conductive balls 135 is formed above or below the dummy pads 101b and 102b adjacent to the active pads 101a and 101b, to thereby improve the reliability of the inspection of the conductive balls 135.

Figure 5:
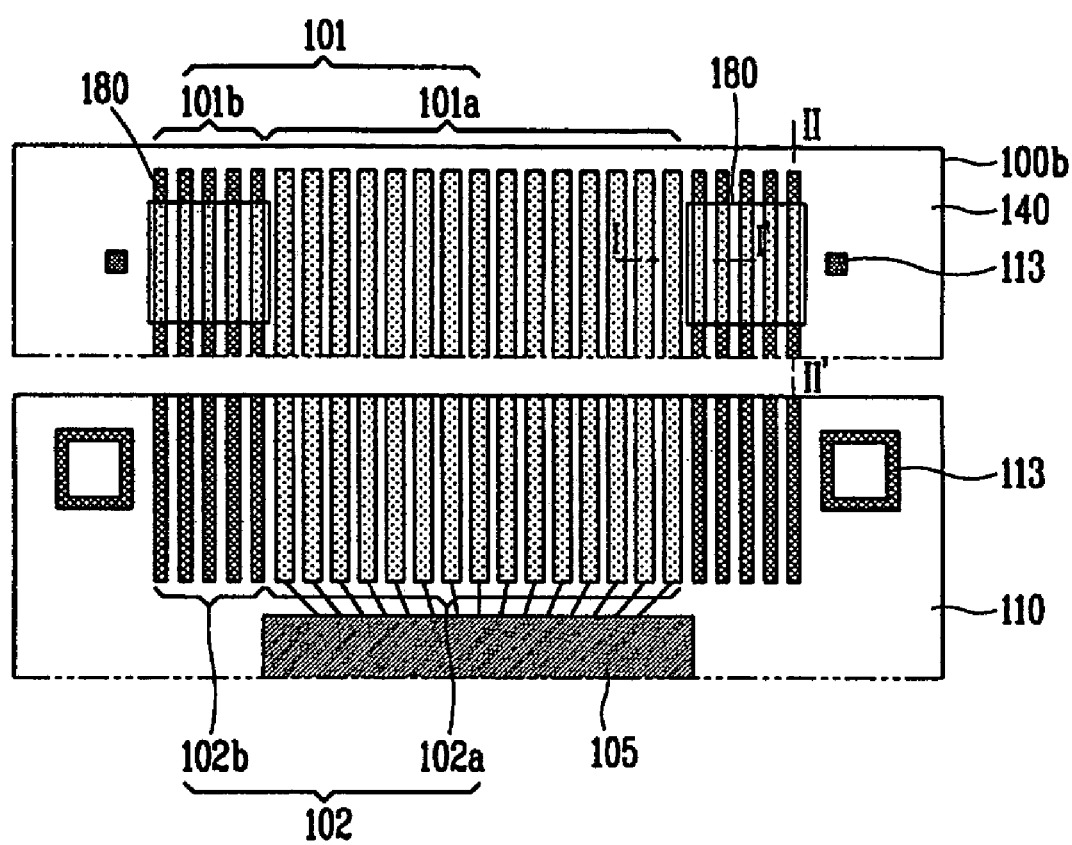
FIG. 5 shows another embodiment of the pad part, in accordance with the present invention.

As shown in FIG. 5, a pad part 140, to which the plurality of gate lines 107 and the plurality of data lines 109 are connected, includes a plurality of active pads 101a connected to the active pads 102a of the TCP 110 and dummy pads 101b, which are not directly connected to the gate lines and data lines, formed at left and right sides of the active pads 101a. The pad part 140 has a region formed of a transparent material. The region formed of the transparent material is a monitoring window 180, through which inspection of the conductive balls 135 is made. The monitoring window 180 can be formed in the TFT substrate 100b at the dummy pads 101b or at the dummy pads 102b of the TCP 110. A region corresponding or facing to the monitoring window 180 may be formed of a translucent material.

An alignment key 113 is formed at left and right sides of the dummy pads 101b and 102b of the TCP 110 and the substrate 100b. By making the alignment keys 113 correspond to each other, the terminal 101 and 102 of the substrate 100b and the TCP 110 will be aligned.

The dummy pads 101b and 102b are not electrically connected to the gate lines and/or the data lines, but they have the same structure as the active pads 101a and 102a. Since the dummy pads 101b and 102b are positioned adjacent to the active pads 101a and 102a, the pressed state of the conductive balls 135 in the region is almost similar to the state at the active pads 101a and 102a.

Therefore, compared to the monitoring window 130 positioned at left and right sides of the dummy pads 101b and 102b in the former embodiment (refer to FIG. 2), the pressed state of the conductive balls through the monitoring window 180 formed at portion of the dummy pads 101b and 102b provides a more reliably indication of the bonding state of the active pads 101a and 101b.

Also at this time, by comparing the number of pressed conductive balls 135 observed through the monitoring windows 180 disposed at left and right sides of the active pads 101a and 102a, the overall uniformly pressed state of the terminals 101 and 103 is determined.

Figure 6A:
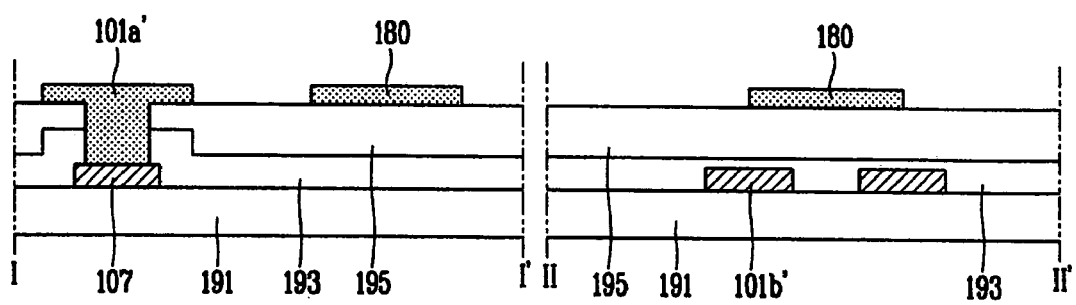
FIGS. 6A and 6B are cross sectional views taken along lines I-I' and II-II' of FIG. 5.
Figure 6B:
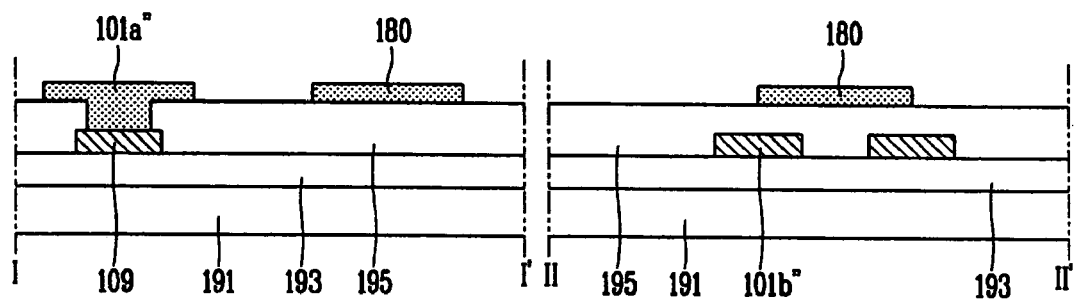

FIGS. 6A and 6B show sections of I-I' and II-II' of the active pad 101a and the monitoring window 180 of the gate pad part and the data pad part of FIG. 5.

First, as shown in FIG. 6A, as for the section of the gate pad part, the gate line 107 and the dummy pad 101b' are formed on a transparent substrate 191, on which a gate insulation film 193 and a passivation film 195 are sequentially formed. And then, the gate pad 101a', electrically connected with the gate line 107 is formed thereon. The gate pad 101a' and the monitoring window 180 are formed together on the passivation film 195. The gate pad 101a' and the monitoring window 180 are formed of a transparent material such as ITO or IZO.

As shown in FIG. 6B, as for the section of the data pad part, the gate insulation film 193 is formed on the transparent substrate 191, on which the data line 109 and the dummy pad 101b" are formed. And then, a passivation film 195 is formed at an upper surface of the data line 109 and the gate insulation film 193.

On the passivation film 195, there are formed the data pad 101a", which is electrically connected with the data line 109, and the monitoring window 180. The data pad 101a" and the monitoring window 180 are formed of a transparent material such as ITO or IZO.

As afore-mentioned, the present invention provides a liquid crystal display wherein a pressed state of the conductive balls can be easily checked via monitoring windows at the pad part. The monitoring windows can be formed either at the TCP or at the liquid crystal panel. By forming the monitoring windows at a portion of the dummy pads, the reliability of judging a conductive state of the conductive balls at the active pads can be improved.

As so far described, the LCD display device and its inspecting method of a bonding state between a liquid crystal display panel and a drive IC of the present invention have the following advantages.

In fabricating an LCD device, when bonding is performed for signal connection with the drive IC, it is easy to inspect whether their electric connection has been made properly. In particular, by forming the monitoring window, formed of a transparent material, at the dummy pad of the drive IC, a pressed state of conductive balls can be easily observed and thus a reliable inspection can be made.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A display device comprising:
a display panel including a pad part, the pad part including a plurality of first signal pads and at least one first dummy pad;
a tape carrier package (TCP) including a plurality of second signal pads and at least one second dummy pad; and
an anisotropic conductive film (ACF) for bonding the pad part to the TCP,
wherein at least one of the pad part and the TCP further includes at least one inspection window for inspecting an operation of the ACF, and the inspection window is disposed adjacent either the first or second dummy pad.

2. The display device of claim 1, wherein the inspection window also functions as an alignment key.

3. The display device of claim 1, wherein there are two second dummy pads respectively on opposite sides of the plurality of second signal pads, and there are two inspection windows respectively adjacent to the two second dummy pads.

4. The display device of claim 1, wherein the first or second dummy pad is a dummy pad for a data line or gate line of the display panel.

5. The display device of claim 1, wherein the inspection window is made of a transparent material.

6. The display device of claim 5, wherein the transparent material is indium tin oxide (ITO) or indium zinc oxide (IZO).

7. The display device of claim 1, further comprising:
a drive IC disposed on the TCP.

8. The display device of claim 1, wherein the ACF includes a plurality of conductive balls.

9. The display device of claim 1, wherein the TCP includes the inspection window for inspecting the operation of the ACF, and the inspection window is formed of a transparent material.

10. The display device of claim 1, wherein the display device is a liquid crystal display device.

11. A liquid crystal display device comprising:
a liquid crystal display panel including a pad part at an edge portion of the panel, the pad part including a plurality of first signal pads and at least one first dummy pad adjacent the first signal pads,
wherein the pad part further includes at least one inspection window for inspecting a bonding operation of the pad part with a tape carrier package (TCP), and
wherein the inspection window is disposed adjacent the first dummy pad and functions as an alignment key.

12. The liquid crystal display device of claim 11, wherein the inspection window is made of a transparent material.

13. The liquid crystal display device of claim 12, wherein the transparent material is indium tin oxide (ITO) or indium zinc oxide (IZO).

14. The liquid crystal display device of claim 11, further comprising:
the TCP including a plurality of second signal pads and at least one second dummy pad adjacent the second signal pads,
wherein the TCP further includes at least one inspection window for inspecting a bonding operation of the pad part with the TCP.

15. The liquid crystal display device of claim 14, wherein the inspection windows are made of a transparent material.

16. The liquid crystal display device of claim 15, wherein the transparent material is indium tin oxide (ITO) or indium zinc oxide (IZO).

17. The liquid crystal display device of claim 11, further comprising:
a drive IC disposed on the TCP.

18. The liquid crystal display device of claim 11, further comprising:
an anisotropic conductive film (ACF) for bonding the pad part to the TCP and including a plurality of conductive balls, wherein the inspection window is for inspecting an operation of the conductive balls in the ACF during the bonding operation.

* * * * *